(12) United States Patent
Lee et al.

(10) Patent No.: US 9,613,562 B2
(45) Date of Patent: Apr. 4, 2017

(54) DISPLAY DEVICE AND METHOD FOR DRIVING THE SAME

(71) Applicant: SAMSUNG DISPLAY CO., LTD, Yongin, Gyeonggi-do (KR)

(72) Inventors: Min-Tak Lee, Seongnam-si (KR); Da-Jeong Lee, Saha-gu (KR); Hyun-Koo Lee, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 170 days.

(21) Appl. No.: 14/489,337

(22) Filed: Sep. 17, 2014

(65) Prior Publication Data

US 2015/0187094 A1 Jul. 2, 2015

(30) Foreign Application Priority Data

Dec. 30, 2013 (KR) .......................... 10-2013-0166549

(51) Int. Cl.
| | | |
|---|---|---|
| *G06T 5/00* | (2006.01) | |
| *G06T 11/00* | (2006.01) | |
| *G09G 3/3208* | (2016.01) | |
| *G09G 3/3291* | (2016.01) | |

(52) U.S. Cl.
CPC ........... *G09G 3/3208* (2013.01); *G06T 5/009* (2013.01); *G09G 3/3291* (2013.01); *G06T 11/00* (2013.01); *G06T 2207/10024* (2013.01); *G09G 2320/0666* (2013.01); *G09G 2320/0673* (2013.01); *G09G 2360/144* (2013.01)

(58) Field of Classification Search
None
See application file for complete search history.

(56) References Cited

U.S. PATENT DOCUMENTS 6,320,668 B1 * 11/2001 Kim .................... H04N 1/40006
358/1.1
6,791,716 B1    9/2004 Buhr et al.
7,084,881 B1 *  8/2006 Chen ..................... G06T 11/001
345/589

(Continued)

FOREIGN PATENT DOCUMENTS

| KR | 10-2006-0081218 A | 7/2006 |
|---|---|---|
| KR | 10-2009-0067457 A | 6/2009 |
| KR | 10-2010-0076202 A | 7/2010 |

*Primary Examiner* — Said Broome
*Assistant Examiner* — Yu-Jang Tswei
(74) *Attorney, Agent, or Firm* — Lewis Roca Rothgerber Christie LLP

(57) ABSTRACT

A display device includes a light sensor, a controller, a data driver, and a scan driver. The controller is configured to correct an input image signal based on an electrical signal output by the light sensor and an input image signal, the controller includes: a first color coordinate calculation unit configured to calculate a color coordinate of reflected light; a second color coordinate calculation unit configured to calculate a color coordinate of dark room output light for at least two grayscale value sections; a combination unit configured to combine the reflected light color coordinate and the dark room output light color coordinate together; and a gamma value setting unit configured to set a gamma value based on a deviation between the combination light color coordinate output by the combination unit and a reference color coordinate.

13 Claims, 11 Drawing Sheets

(56) References Cited

U.S. PATENT DOCUMENTS

| | | | |
|---|---|---|---|
| 2003/0179211 A1* | 9/2003 | Wada | H04N 9/73 345/589 |
| 2004/0001185 A1* | 1/2004 | Wada | H04N 5/58 353/31 |
| 2009/0160880 A1 | 6/2009 | Park et al. | |
| 2010/0165002 A1 | 7/2010 | Ahn | |

* cited by examiner

FIG. 6

| | Color | CIE 1931 | |
|---|---|---|---|
| | | X | Y |
| 1 | DARK SKIN | 0.397 | 0.360 |
| 2 | LIGHT SKIN | 0.380 | 0.356 |
| 3 | BLUE SKY | 0.252 | 0.265 |
| 4 | FOLIAGE | 0.335 | 0.428 |
| 5 | BLUE FLOWER | 0.270 | 0.252 |
| 6 | BLUISH GREEN | 0.264 | 0.358 |
| 7 | ORANGE | 0.500 | 0.413 |
| 8 | PURPILISH BLUE | 0.219 | 0.188 |
| 9 | MODERATE RED | 0.453 | 0.318 |
| 10 | PURPLE | 0.292 | 0.218 |
| 11 | YELLOW GREEN | 0.374 | 0.495 |
| 12 | ORANGE YELLOW | 0.467 | 0.445 |
| 13 | BLUE | 0.196 | 0.142 |
| 14 | GREEN | 0.303 | 0.486 |
| 15 | RED | 0.529 | 0.323 |
| 16 | YELLOW | 0.442 | 0.478 |
| 17 | MAGENTA | 0.369 | 0.245 |
| 18 | CYAN | 0.210 | 0.273 |
| 19 | WHITE | 0.313 | 0.330 |
| 20 | NEUTRAL 8 | 0.313 | 0.329 |
| 21 | NEUTRAL 6.5 | 0.313 | 0.329 |
| 22 | NEUTRAL 5 | 0.314 | 0.331 |
| 23 | NEUTRAL 3.5 | 0.313 | 0.329 |
| 24 | BLACK | 0.313 | 0.329 |

FIG. 8

| | Color | RGB 8bit | | |
|---|---|---|---|---|
| | | r | g | b |
| 1 | DARK SKIN | 115 | 82 | 68 |
| 2 | LIGHT SKIN | 194 | 150 | 130 |
| 3 | BLUE SKY | 98 | 122 | 157 |
| 4 | FOLIAGE | 87 | 108 | 67 |
| 5 | BLUE FLOWER | 133 | 128 | 177 |
| 6 | BLUISH GREEN | 103 | 189 | 170 |
| 7 | ORANGE | 214 | 126 | 44 |
| 8 | PURPILISH BLUE | 80 | 91 | 166 |
| 9 | MODERATE RED | 193 | 90 | 99 |
| 10 | PURPLE | 94 | 60 | 108 |
| 11 | YELLOW GREEN | 157 | 188 | 64 |
| 12 | ORANGE YELLOW | 224 | 163 | 46 |
| 13 | BLUE | 56 | 61 | 150 |
| 14 | GREEN | 70 | 148 | 73 |
| 15 | RED | 175 | 54 | 60 |
| 16 | YELLOW | 231 | 199 | 31 |
| 17 | MAGENTA | 187 | 86 | 149 |
| 18 | CYAN | 8 | 133 | 161 |
| 19 | WHITE | 243 | 243 | 242 |
| 20 | NEUTRAL 8 | 200 | 200 | 200 |
| 21 | NEUTRAL 6.5 | 160 | 160 | 160 |
| 22 | NEUTRAL 5 | 122 | 122 | 121 |
| 23 | NEUTRAL 3.5 | 85 | 85 | 85 |
| 24 | BLACK | 52 | 52 | 52 |

FIG. 9

| Dark skin | | R | G | B |
|---|---|---|---|---|
| γ1 | γ2 | | | |
| 0 | 0 | 0.574574016 | 0.574574016 | 0.574574016 |
| 0 | 0.1 | 0.3301353 | 0.3301353 | 0.3301353 |
| 0 | 0.2 | 0.189687165 | 0.189687165 | 0.189687165 |
| 0 | 0.3 | 0.108989316 | 0.108989316 | 0.108989316 |
| 0 | 0.4 | 0.062622429 | 0.062622429 | 0.062622429 |
| 0 | 0.5 | 0.035981221 | 0.035981221 | 0.035981221 |
| 0 | 0.6 | 0.020673874 | 0.020673874 | 0.020673874 |
| ⋮ | ⋮ | ⋮ | ⋮ | ⋮ |
| 10 | 9.2 | 0.029296028 | 0.000347998 | 0.00015308 |
| 10 | 9.3 | 0.016832737 | 0.000571893 | 8.7956E-05 |
| 10 | 9.4 | 0.009671653 | 0.000328595 | 5.05372E-05 |
| 10 | 9.5 | 0.005557081 | 0.000188802 | 2.90374E-05 |
| 10 | 9.6 | 0.003192954 | 0.000108481 | 1.66841E-05 |
| 10 | 9.7 | 0.001834588 | 6.23302E-05 | 9.58626E-06 |
| 10 | 9.8 | 0.001054107 | 3.58133E-05 | 5.50802E-06 |
| 10 | 9.9 | 0.000605662 | 2.05774E-05 | 3.16476E-06 |
| 10 | 10 | 0.000347998 | 1.18232E-05 | 1.81839E-06 |

DISPLAY DEVICE AND METHOD FOR DRIVING THE SAME

CROSS-REFERENCE TO RELATED APPLICATION

This application claims priority to and the benefit of Korean Patent Application No. 10-2013-0166549, filed on Dec. 30, 2013, with the Korean Intellectual Property Office, the disclosure of which is incorporated herein in its entirety by reference.

BACKGROUND

1. Field

Aspects of example embodiments of the present invention relate to a display device that implements gamma correction in consideration of an effect of ambient light, and a method for driving the same.

2. Description of the Related Art

Recently, flat panel displays (FPDs) have been developed as display devices. There are various types of FPDs such as, for example, a liquid crystal display (LCD), a plasma display panel (PDP), and an organic light emitting diode (OLED) display. Among these, the OLED display includes organic light emitting diodes (OLEDs) that emit light by recombination of electrons and holes so as to display an image. The OLED display is drawing attention because of features such as short response time, low power consumption, and improved light emission efficiency, luminance, and viewing angle.

In general, the OLED display is classified into two types, namely a passive-matrix OLED (PMOLED) and an active-matrix OLED (AMOLED), according to methods of driving the OLEDs.

Of the two types, the active-matrix OLED, in which unit pixels are selectively lit in terms of resolution, contrast, and operation speed, is primarily used.

In a display device, image quality may be degraded by an influence of reflected light by ambient light incident from the outside. Thus, a sensor measuring ambient light may be further installed in the display device so that luminance is adjusted according to the ambient light.

The foregoing is intended merely to aid in the understanding of the background of the present invention, and is not intended to convey that the present invention falls within the purview of the related art that is known to those having ordinary skill in the art.

SUMMARY

Aspects of example embodiments of the present invention relate to a display device for performing gamma correction to display a color reflecting properties of human vision according to ambient light so as to improve image quality.

Further, aspects of example embodiments of the present invention relate to a method for driving a display device with improved quality of color display according to ambient light by gamma correction.

According to an embodiment of the present invention, a display device in which an image signal is converted by using a gamma curve correction is provided. The display device includes: a light sensor configured to measure ambient light to be converted to an electrical signal; a controller configured to correct an input image signal based on the electrical signal output by the light sensor and the input image signal, the controller including: a first color coordinate calculation unit configured to calculate a color coordinate of reflected light; a second color coordinate calculation unit configured to calculate a color coordinate of dark room output light for at least two grayscale value sections; a combination unit configured to combine the reflected light color coordinate output by the first color coordinate calculation unit and the dark room output light color coordinate output by the second color coordinate calculation unit together; and a gamma value setting unit configured to set a gamma value based on a deviation between the combination light color coordinate output by the combination unit and a reference color coordinate; a data driver configured to apply output image data corrected by the controller to a plurality of pixels; and a scan driver configured to apply scan signals to the plurality of pixels so that the output image data is applied to the plurality of pixels.

The controller may further include a gamma curve generating unit configured to generate a gamma curve corresponding to a grayscale value on the basis of a gamma value output by the gamma value setting unit.

The gamma curve generating unit may be configured to generate a gamma curve by the following Formula 2:

a first section output grayscale value(luminance):
$$Y_1 = g^{\gamma 1}; \text{ and}$$

a second section output grayscale value(luminance):
$$Y_2 = a' \times (g^{\gamma 2}) + b'.$$

The controller may further include a gamma correction unit configured to correct gray levels of input image data utilizing a gamma curve generated by a gamma curve generating unit to output image data.

The gamma value setting unit may be configured to obtain an average value of the deviations for colors and to set a gamma value corresponding to the minimum value of the average values of the deviations.

The gamma value setting unit may be configured to calculate the deviation using the following Formula 8:

$$\Delta xy = ((x'-x)^2 + (y'-y)^2)^{1/2}$$

The first color coordinate calculation unit may be configured to calculate the reflected light color coordinate (X', Y', Z') by the following Formula 3:

$$X' = 0.00226 \times \text{relative } X \text{ of a light source} \times \text{reflectance (SCI)} \times \text{illuminance};$$

$$Y' = 0.00226 \times \text{relative } Y (=1) \text{ of a light source} \times \text{reflectance (SCI)} \times \text{illuminance}; \text{ and}$$

$$Z' = 0.00226 \times \text{relative } Z \text{ of a light source} \times \text{reflectance (SCI)} \times \text{illuminance}.$$

The second color coordinate calculation unit may be configured to calculate the dark room output light color coordinate by the following Formulas 4 and 5:

a first section $$R = (r^{\gamma 1})/(255^{\gamma 1})$$

$$G = (g^{\gamma 1})/(255^{\gamma 1})$$

$$B = (b^{\gamma 1})/(255^{\gamma 1})$$

a second section $$R = (a \times (r^{\gamma 2}/255^{\gamma 2}) + b)$$

$$G = (a \times (g^{\gamma 2}/255^{\gamma 2}) + b)$$

$$B = (a \times (b^{\gamma 2}/255^{\gamma 2}) + b)$$

$$a = (\gamma1 \times \text{boundary grayscale}^{(\gamma1-1)}) \div (\gamma2 \times \text{boundary grayscale}^{(\gamma2-1)})$$

$$b = (\text{boundary grayscale}^{(\gamma1)}) \div (a \times \text{boundary grayscale}^{(\gamma2)}); \text{ and} \qquad \text{Formula 4}$$

$$\begin{bmatrix} X'' \\ Y'' \\ Z'' \end{bmatrix} = \begin{bmatrix} 0.57667 & 0.18556 & 0.18823 \\ 0.29734 & 0.62736 & 0.07529 \\ 0.02703 & 0.07069 & 0.99134 \end{bmatrix} \begin{bmatrix} R \\ G \\ B \end{bmatrix}. \qquad \text{Formula 5}$$

The display device may further include a reference color coordinate unit configured to provide the gamma value setting unit with a reference color coordinate.

The reference color coordinate unit may include a color coordinate of colors of a Macbeth color chart.

The controller may further include a lookup table configured to store a plurality of gamma curves previously calculated based on the reflected light and the dark room output light.

The gamma correction unit may be further configured to apply gamma correction to the input image data using different gamma curves according to colors.

According to an embodiment of the present invention, a method for driving a display device includes: measuring ambient light by a light sensor to be converted into an electrical signal; calculating a color coordinate of reflected light by a first color coordinate calculation unit; calculating a color coordinate of dark output light by a second color coordinate calculation unit; combining the reflected light color coordinate and the dark output light color coordinate together, respectively output by the first color coordinate calculation unit and the second color coordinate calculation unit, by a combination unit; and setting a gamma value by a gamma value setting unit based on a deviation between the combined light color coordinate output by the combination unit and a reference color coordinate.

The method may further include generating a gamma curve using a preset gamma value.

According to example embodiments of the present invention, a display device performs gamma correction for excellent color display as in a dark room, thereby securing good display quality even in an ambient light environment.

The foregoing summary is illustrative only and is not intended to be in any way limiting. In addition to the illustrative aspects, embodiments, and features described above, further aspects, embodiments, and features will become apparent to those having ordinary skill in the art by reference to the drawings and the following detailed description.

BRIEF DESCRIPTION OF THE DRAWINGS

Aspects of embodiments of the present invention will be more clearly understood from the following detailed description when taken in conjunction with the accompanying drawings, in which:

FIG. 6 is a chart of twenty-four (24) color coordinates of a Macbeth Color Chart according to an embodiment of the present invention;

FIG. 8 is a chart of 8 bit sRGB grayscale values corresponding to the Macbeth Color Chart;

FIG. 9 is a chart showing a part of gamma-corrected color coordinates in the Macbeth Color Chart according to an embodiment of the present invention;

DETAILED DESCRIPTION

Figure 1:
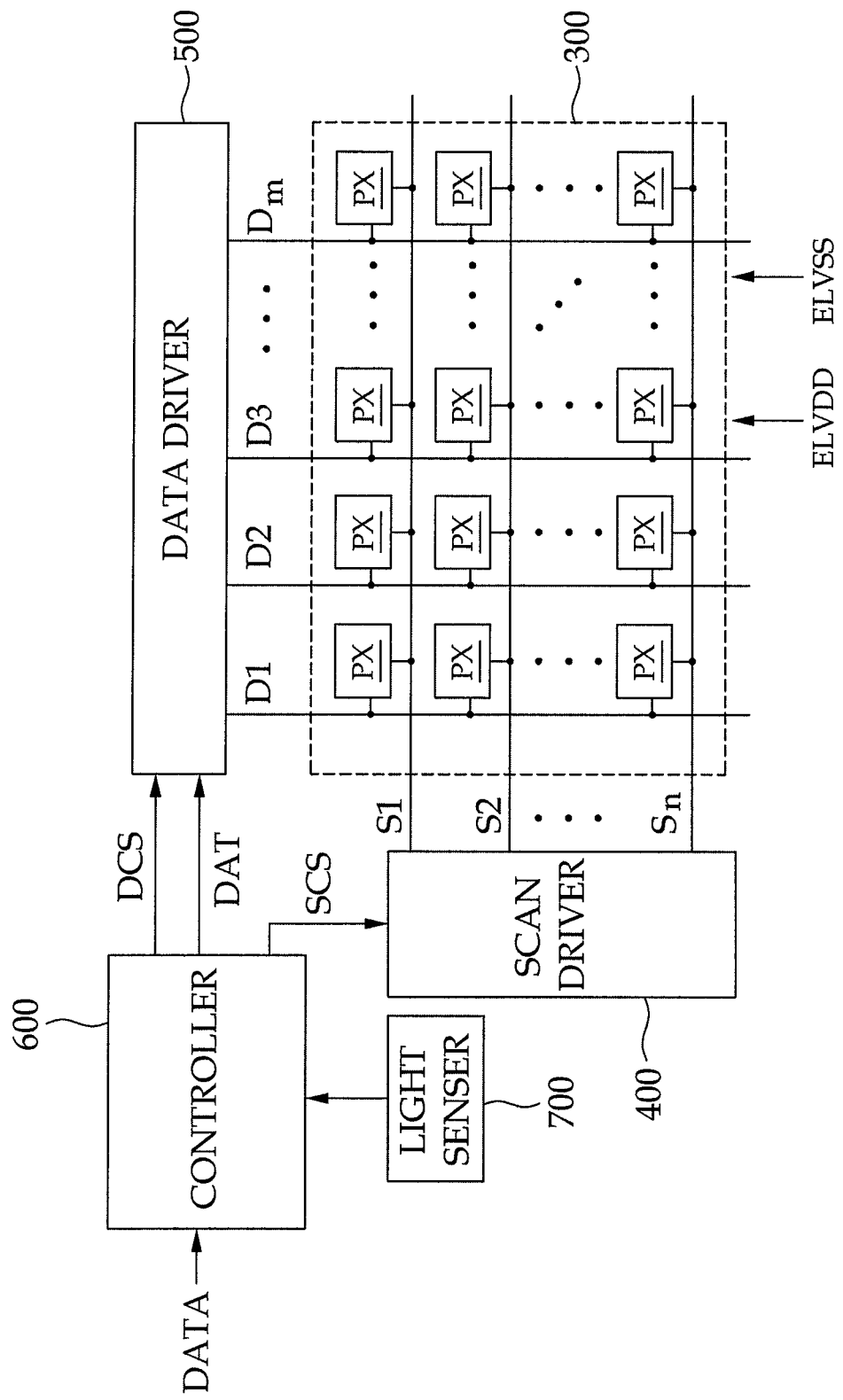
FIG. 1 is a block diagram illustrating an organic light emitting diode (OLED) display according to an embodiment of the present invention.

FPDs that include a sensor to measure ambient light may improve contrast by adjusting luminance, but a distortion of a color coordinate, which is caused by mixed colors of dark room output light and reflected light of ambient light on the display device, may occur.

Accordingly, it is desirable to provide FPDs capable of displaying an accurate color even in an ambient light environment, by adjusting gamma characteristics by calculating luminance of the reflected light of ambient light and a color coordinate, and a driving method thereof.

Hereinafter, embodiments of the present invention will be described in more detail with reference to the accompanying drawings. Although the present invention can be modified variously and has several embodiments, specific embodiments are illustrated in the accompanying drawings and will be mainly described in the specification. However, the scope of the present invention is not limited to the specific embodiments and should be construed as including all the changes, equivalents, and substitutions included in the spirit and scope of the present invention.

Some of the parts which are not associated with the description may be omitted in order to specifically describe embodiments of the present invention, and like reference numerals refer to like elements throughout the specification.

Unless otherwise defined, all terms including technical and scientific terms used herein have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present application.

Hereinafter, structures and operations of example embodiments of the present invention will be described in detail with reference to the accompanying drawings.

FIG. 1 is a block diagram illustrating an organic light emitting diode (OLED) display according to an embodiment of the present invention.

Referring to FIG. 1, the OLED display includes a display unit 300, a scan driver 400, a data driver 500, a controller 600, and a light sensor 700.

The controller 600 is configured to generate a data driving control signal DCS and a scan driving control signal SCS in response to synchronization signals supplied from an external device. The data driving control signal DCS generated by the controller 600 is supplied to the data driver 500, and the scan driving control signal SCS is supplied to the scan driver 400. The controller 600 is also configured to data process a data signal DATA (e.g., input image data or input image signal), which is image information supplied from the external device, into gamma-corrected data DAT (e.g., output image data or output image signal), and to supply the gamma-corrected data DAT to the data driver 500.

The scan driver 400 is coupled to (e.g., connected to) scan lines S1 to Sn of the display unit 300. The scan driver 400 is configured to apply scan signals to the scan lines S1 to Sn. The scan signals may be formed by combination of a gate-on voltage Von that turns on a switching element (e.g., M1 of FIG. 2) and a gate-off voltage Voff that turns off the switching element.

The data driver 500 is coupled to data lines D1 to Dm of the display unit 300, and is configured to apply voltage to a display panel according to the gamma-corrected data DAT supplied from the controller 600.

The display unit 300 includes a plurality of scan lines S1 to Sn, a plurality of data lines D1 to Dm, and a plurality of pixels PX. The plurality of pixels PX are coupled to the plurality of scan lines S1 to Sn and the plurality of data lines D1 to Dm, so as to be generally arranged in matrix form. The plurality of scan lines S1 to Sn are arranged along a column direction and extend generally in a row direction of the pixel arrangement so as to be substantially parallel to each other. The plurality of data lines D1 to Dm are arranged along a row direction and extend generally in a column direction so as to be substantially parallel to each other in the arrangement of the pixels. The display unit 300 receives a driving power source ELVDD and a ground power source ELVSS through a wire so that light is emitted by an organic light emitting diode (OLED) in the pixel PX.

The light sensor 700 is configured to measure illuminance of ambient light and a color coordinate (X, Y, Z) to be converted into an electrical signal. The light sensor 700 supplies the electrical signal to the controller 600. The controller 600 is configured to convert the input image data DATA into output image data DAT to be applied to the data driver 500 according to the electrical signal transmitted from the light sensor 700.

Each of the above-described driving devices 400, 500, and 600 may be mounted directly on the display unit 300 in a form of at least one integrated circuit (IC), on a flexible printed circuit board, or on a separate printed circuit board (PCB). Alternatively, the driving devices 400, 500, and 600 may be integrated into the display unit 300, together with the scan lines S1 to Sn and the data lines D1 to Dm.

Figure 2:
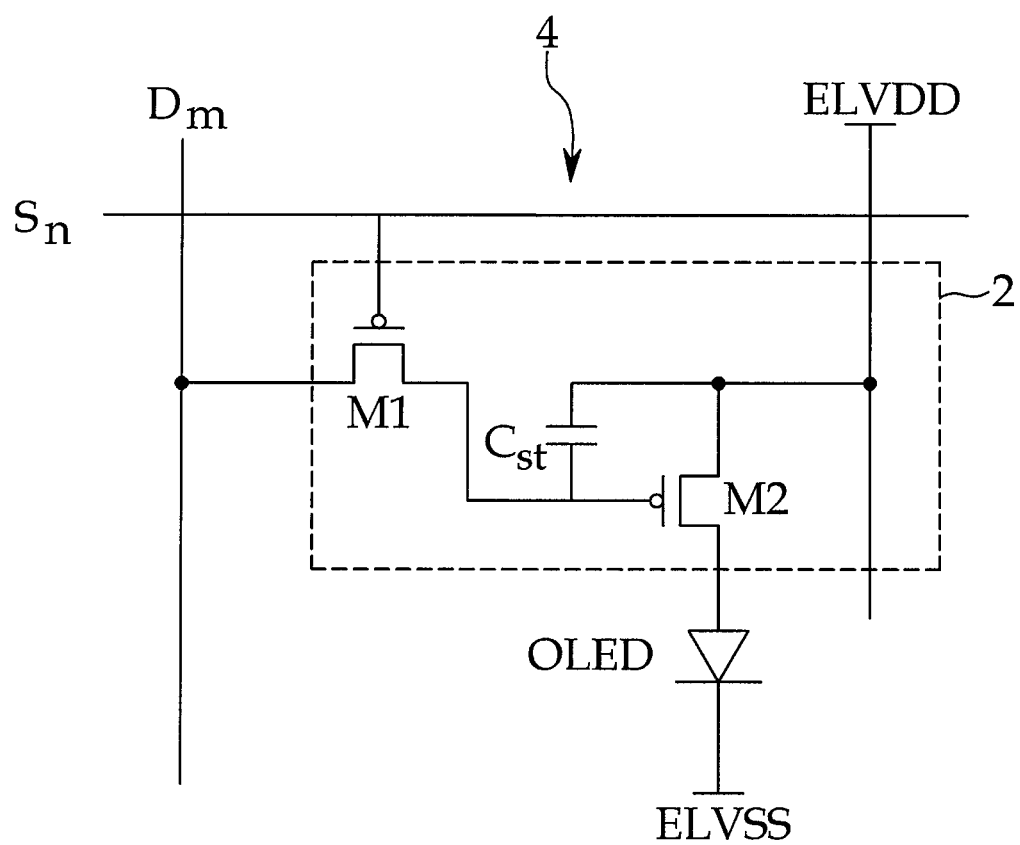
FIG. 2 is a circuit diagram illustrating a pixel circuit structure of the OLED display illustrated in FIG. 1.

FIG. 2 is a circuit diagram illustrating a pixel circuit structure of the OLED display illustrated in FIG. 1.

Referring to FIG. 2, the pixel 4 of the OLED display includes the OLED and a pixel circuit 2. The pixel circuit 2 is coupled to the data line Dm and to the scan line Sn so as to control the OLED.

An anode of the OLED is coupled to the pixel circuit 2, and a cathode of the OLED is coupled to the ground power source ELVSS. The OLED is configured to generate light having a luminance (e.g., predetermined luminance) in response to a current supplied from the pixel circuit 2.

The pixel circuit 2 is configured to control an amount of current supplied to the OLED in response to the data signal supplied to the data line Dm, when the scan signal is supplied to the scan line Sn. The pixel circuit 2 includes a driving transistor M2, a switching transistor M1, and a storage capacitor $C_{st}$. The driving transistor M2 is coupled between the driving power source ELVDD and the OLED. The switching transistor M1 is coupled to the driving transistor M2, the data line Dm, and the scan line Sn. The storage capacitor $C_{st}$ is coupled between the gate electrode of the driving transistor M2 and a first electrode of the driving transistor M2.

A gate electrode of the switching transistor M1 is coupled to the scan line Sn, and a first electrode of the switching transistor M1 is coupled to the data line Dm. A second electrode of the switching transistor M1 is coupled to the gate electrode of the driving transistor M2 and to one terminal of the storage capacitor $C_{st}$. The switching transistor M1 is turned on when the scan signal is applied thereto from the scan line Sn, so that the data signal applied from the data line Dm is supplied to the driving transistor M2 and the storage capacitor $C_{st}$. The storage capacitor $C_{st}$ is charged with the voltage corresponding to the data signal.

The gate electrode of the driving transistor M2 is coupled to one terminal of the storage capacitor $C_{st}$. The first electrode of the driving transistor M2 is coupled to the other terminal of the storage capacitor $C_{st}$ and to the driving power source ELVDD. A second electrode of the driving transistor M2 is coupled to the anode of the OLED. The driving transistor M2 controls an amount of current flowing to the OLED from the driving power source ELVDD in response to a voltage value stored in the storage capacitor $C_{st}$. The OLED generates light having a luminance corresponding to the amount of current provided through the driving transistor M2.

The OLED emits light having one color among primary colors, for example. Examples of the primary colors may include three primary colors of red, green, and blue, and a desired color is displayed by a spatial or temporal sum of these three primary colors. In one example, some OLEDs may emit white light, and thus luminance may increase. In another example, the OLED of all of the pixels PX may emit white light, and some pixels PX may further include a color filter that converts the white light emitted from the OLED into light of any one of the primary colors, for example.

The switching transistor M1 and the driving transistor M2 may be a p-channel field-effect transistor (FET). However, at least one of the driving transistor M2 or the switching transistor M1 may be an n-channel field-effect transistor (FET). Further, the connection relations of the transistors M1 and M2, the storage capacitor $C_{st}$, and the OLED may vary. The pixel PX shown in FIG. 2 is one example of one pixel of a display device, but embodiments of the present invention are not limited thereto, and a different type of pixel including at least two transistors or at least one capacitor may be adopted.

A driving method of a display device according to an embodiment of the present invention will now be described in detail.

The controller 600 receives video signals R, G, and B input from an external device and input control signals for controlling display of the input video signals. The video signals R, G, and B include luminance information of each pixel PX, and the luminance has a number of grays (e.g., a predetermined number of grays or gray levels), for example, $1024(=2^{10})$, $256(=2^8)$, or $64(=2^6)$. That is, the video signal includes grayscale data. The input control signals include, for example, a vertical synchronization signal Vsync, a horizontal synchronization signal Hsync, a main clock signal MCLK, and a data enable signal DE.

The controller 600 processes the input video signals R, G, and B to meet operation conditions of the display unit 300 and the data driver 500, based on the input video signals R, G, and B and the input control signals. The controller 600 then generates a data driving control signal DCS and a scan driving control signal SCS. The scan driving control signal SCS is supplied to the scan driver 400, and the data driving control signal DCS and the processed data signal DAT are supplied to the data driver 500.

The controller 600 sets a gamma value by considering an influence of ambient light and executes the process of treating the data signal DAT. The light sensor 700 measures illuminance of the ambient light and the color coordinate to convert the measured illuminance and color coordinate into an electrical signal, and transmits the electrical signal to the controller 600. For example, as the illuminance of the ambient light increases, the light sensor 700 increases the voltage or the current to represent the illuminance information. The light sensor 700 can also detect input color temperature or color coordinate of the ambient light. The controller 600 selects a gamma value corresponding to the measured illuminance among a plurality of gamma values to be adjusted to the illuminance environment of the ambient light in which a gamma curve representing a relation of output grayscale data according to the change of input grayscale data is measured. The controller 600 generates a gamma curve based on the selected gamma value. Alternatively, the light sensor 700 may calculate an optimum gamma value in real time with respect to the illuminance environment of the ambient light, and generate a gamma curve based on the calculated gamma value. The data signal DAT is processed according to output gray levels corresponding to input gray levels according to the gamma curve.

The data driver 500 receives the output image data DAT from the controller 600 and selects the gray voltage corresponding to the output image data DAT. The data driver 500 converts the output image data DAT into an analog data signal. The data driver 500 applies a plurality of data signals for a plurality of pixels PX of one corresponding pixel row among a plurality of pixel rows to corresponding data lines D1 to Dm according to the data driving control signal DCS. According to another embodiment of the present invention, the method of setting a gamma value can be applied to a digital driving method in which a single frame consists of a plurality of subfields, and grayscale levels are displayed by combinations of the subfields, in addition to the analog driving method.

The scan driver 400 applies the gate-on voltage Von to the scan lines S1 to Sn according to the scan driving control signal SCS so that the switching transistors M1 coupled to (e.g., connected to) the scan lines S1 to Sn are turned on. The plurality of data signals applied to the data lines D1 to Dm are respectively transmitted to one terminal of the storage capacitor $C_{st}$ through the turned-on switching transistors M1 of the corresponding pixels PX. The storage capacitor $C_{st}$ is charged with the voltage corresponding to the data signal. The driving transistor M2 is turned on so current flows to the OLED from the driving power source ELVDD corresponding to the voltage stored in the storage capacitor $C_{st}$. The OLED generates light corresponding to the current amount provided through the driving transistor M2.

By repeating the process in a unit of one horizontal period (referred to as "1 H", the same as one period of the horizontal synchronization signal Hsync and data enable signal DE), the gate-on voltage Von is sequentially applied to all of the scan lines S1 to Sn, and the data signal is applied to all of the pixels PX so that an image of one frame is displayed.

Figure 3:
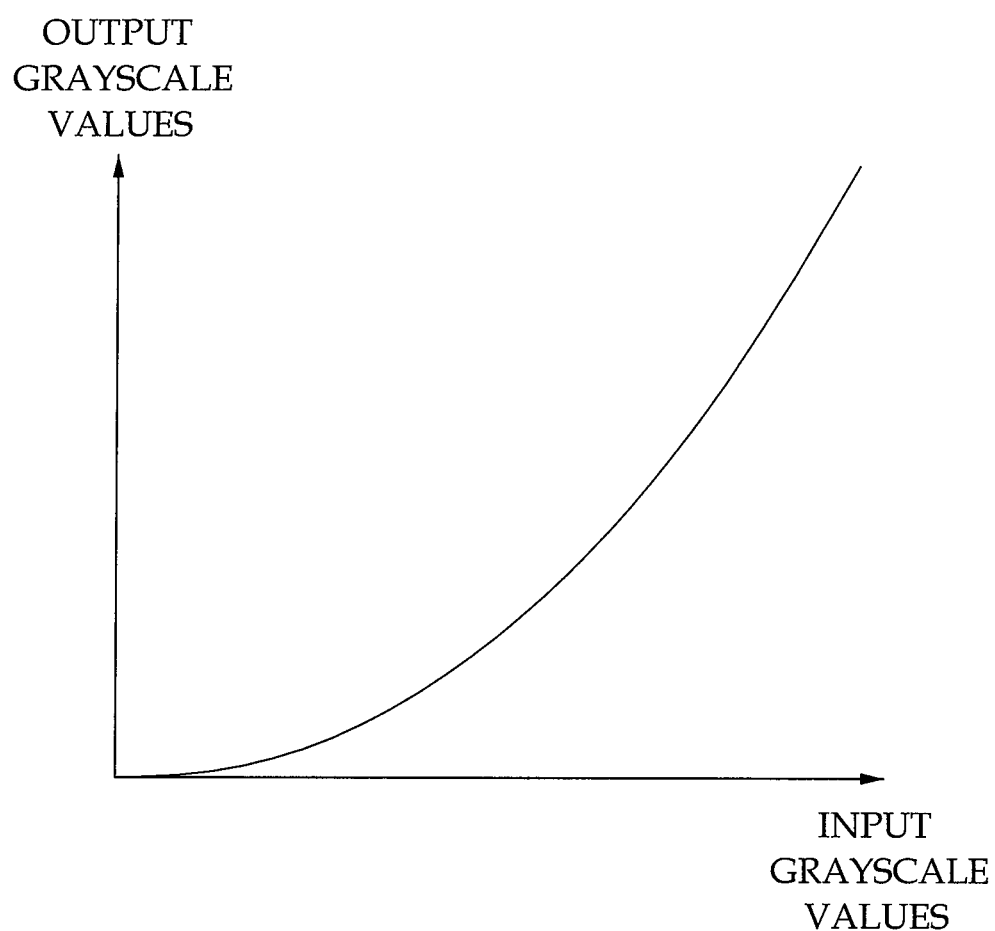
FIG. 3 is a graph of a conventional gamma curve.

Next, FIG. 3 is a graph showing a gamma curve. In the graph of FIG. 3, the horizontal axis represents gray levels (or grayscale values) of an input image signal, and the vertical axis represents an output gray levels (or grayscale values) of a gamma-corrected image signal or an output voltage thereof. The gamma correction is an image processing method of converting an input signal to suit luminance characteristics of a display panel, and is generally represented by the following Formula 1:

$$Y = X^\gamma \quad \text{Formula 1}$$

Herein, X denotes a grayscale value of the input image, and Y denotes a grayscale value of the gamma-corrected output image or an output voltage thereof. In a general OLED display, the gamma correction unit uses a gamma curve calculated by employing a gamma value (γ) of 2.2. In the case of the gamma curve of 2.2, as the grayscale value increases as shown in FIG. 3, the output luminance also increases exponentially. However, the gamma curve of FIG. 3 is calculated with reference to a dark room where ambient light is blocked, and thus it fails to correspond to conditions of a bright room such as an environment where the OLED display may actually be used, for example, an ambient light environment where dark room output light of a display image and reflected light of ambient light are mixed.

The display device according to an embodiment of the present invention prevents or reduces distortion of colors in an environment where the display device may actually be used so that good quality of images are provided to users.

Figure 4:
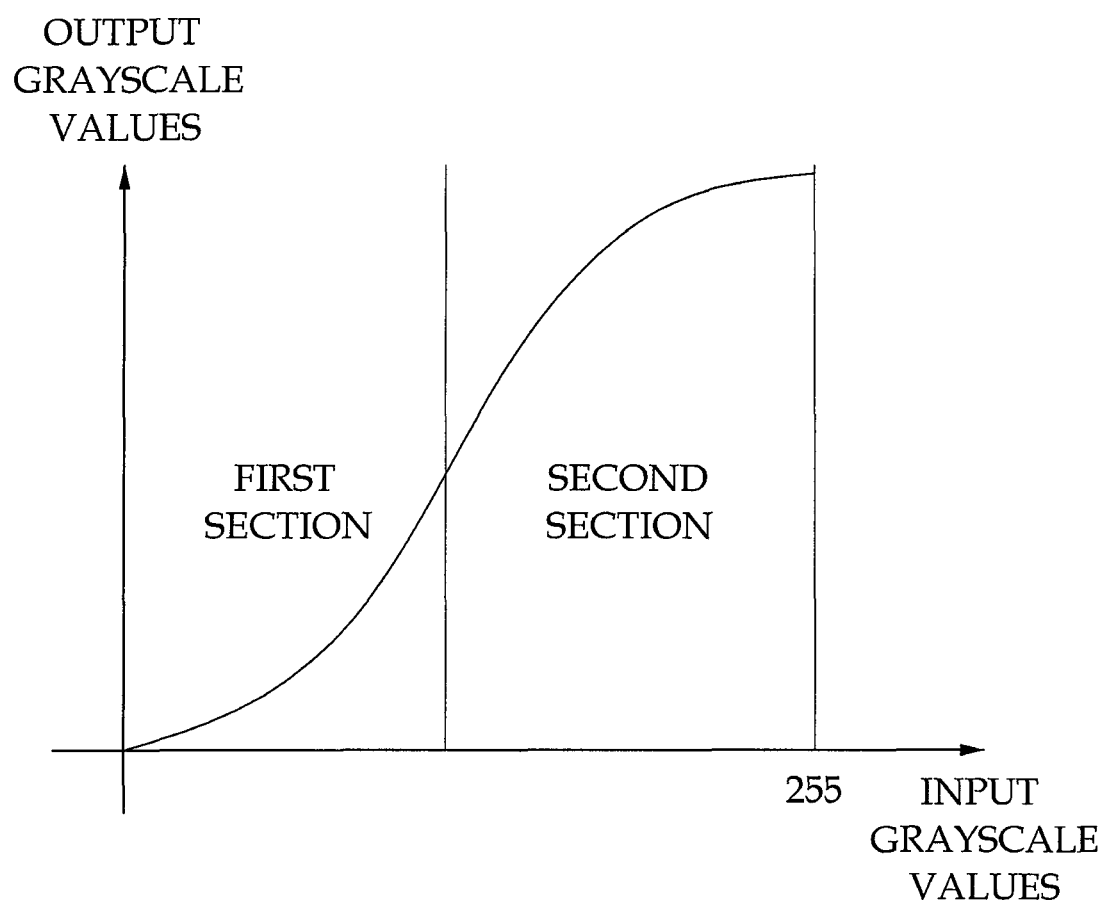
FIG. 4 is a graph showing a gamma curve according to an embodiment of the present invention.

FIG. 4 is a graph showing a gamma curve according to an embodiment of the present invention. According to an embodiment of the present invention, an input grayscale value section of a gamma curve may be divided into two sections, for example, a first section and a second section. The first section is set to be a low grayscale value region and the second section is set to be a high grayscale value region. The input grayscale value section may be divided at a boundary of a grayscale value of 128 on the basis of 8-bit digital data, for example. However, the grayscale value dividing the input grayscale value section into the first and second sections can be set at a user's or developer's discretion, and is not limited thereto.

Referring to FIGS. 2, 4, and 6, since the output image data DAT of the controller 600 is used as input data of the data driver 500, the output image data DAT is proportional to luminance of the display device. Relations of an input image grayscale value and an output image grayscale value, namely, output luminance, in the first and second sections are represented by the following Formula 2:

A first section output grayscale value(luminance):
$$Y1 = g^{\gamma 1}$$

A second section output grayscale value(luminance):
$$Y2 = a' \times (g^{\gamma 2}) + b' \quad \text{Formula 2}$$

The first section output grayscale value ($Y_1$) is calculated by using a first gamma value (γ1) to have an exponential function curve as in the graph of FIG. 3, and the second section output grayscale value ($Y_2$) is calculated by using a', b', and a second gamma value (γ2). At or near a boundary grayscale value, which is an input grayscale value that separates the first and second sections, and at an input grayscale value adjacent the boundary grayscale value, it is desirable for the output grayscale value to not change rapidly but to have a continuous value. Therefore, the a' and b' may be set not to change a slope of the gamma curve dramatically in the boundary grayscale value region, and may be defined below by Formula 4.

Figure 5:
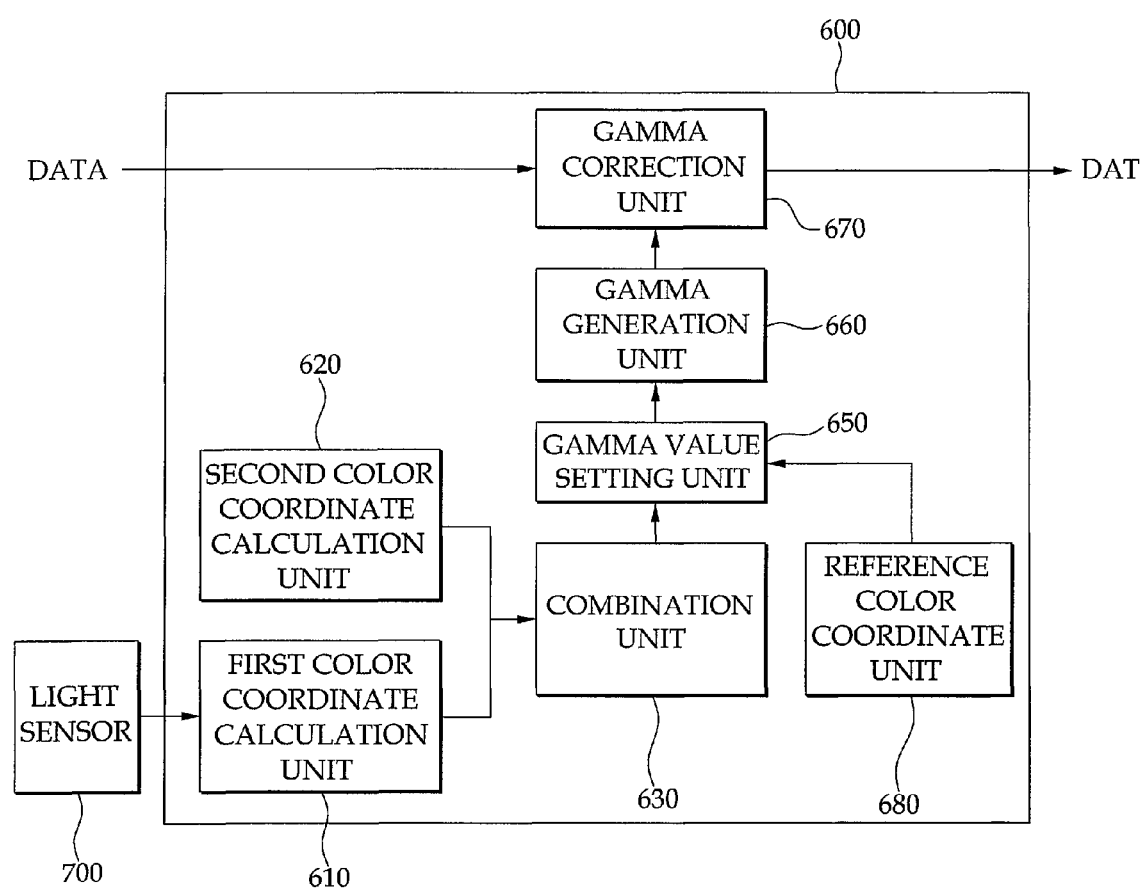
FIG. 5 is a block diagram illustrating a controller according to an embodiment of the present invention.

FIG. 5 is a block diagram illustrating a controller according to an embodiment of the present invention.

Referring to FIG. 5, the controller 600 includes a first color coordinate calculation unit 610, a second color coordinate calculation unit 620, a combination unit 630, a gamma value setting unit 650, a gamma curve generating unit 660, a gamma correction unit 670, and a reference color coordinate unit 680.

The first color coordinate calculation unit 610 receives an electrical signal from the light sensor 700 so as to calculate a color coordinate of reflected light.

The second color coordinate calculation unit 620 calculates a color coordinate of output light which does not consider the reflected light, for example, dark room output light for grayscale value sections.

The combination unit 630 combines the results of the first and second color coordinate calculation units 610 and 620 so as to calculate a color coordinate of the combination light visible to a user under ambient light conditions.

The reference color coordinate unit 680 stores a reference color coordinate of a plurality of colors.

The gamma value setting unit 650 compares the differences between the color coordinate of combination light calculated by the combination unit 630 and the reference color coordinate of the reference color coordinate unit 680 so as to set a gamma value. The gamma curve generating unit 660 generates a gamma curve by Formula 2 on the basis of the gamma value set by the gamma value setting unit 650. The gamma correction unit 670 applies gamma correction to the input image data DATA using the gamma curve generated by the gamma curve generating unit 660, and outputs the output image data DAT to the data driver 500.

FIG. 6 is a chart showing twenty-four (24) color coordinates of a Macbeth Color Chart according to an embodiment of the present invention.

A reference color coordinate is first used to calculate a gamma curve corresponding to ambient light. According to an embodiment of the present invention, as the reference color coordinate, the Macbeth Color Chart is described by using CIE 1931 color coordinates using information measured under standard illuminant D50 as shown in FIG. 6. The Macbeth Color Chart defines a set of standard colors with respect to 24 colors (Dark Skin, Light Skin, Blue Sky, Foliage, Blue Flower, Blush Green, Orange, Purplish blue, Moderate Red, Purple, Yellow Green, Orange Yellow, Blue, Green, Red, Yellow, Magenta, Cyan, White, Neutral 8, Neutral 6.5, Neutral 5, Neutral 3.5, Black), and is employed as a standard color chart in a variety of areas where colors are utilized.

According to an embodiment of the present invention, the Macbeth Color Chart is used as a reference color chart of the reference color coordinate. However, embodiments of the present invention are not limited thereto, and the reference color coordinate can be set by using different color charts besides the Macbeth Color Chart. Further, different standard illuminants other than D50 can be employed to set the reference color coordinate.

The reference color coordinate unit 680 may have a fixed coordinate value, and thus the coordinate value may be predetermined and the predetermined coordinate value may be stored in the controller 600 of a display device. When light is written, CIE XYZ is generally written with uppercase letters X, Y, Z. The CIE XYZ color coordinate is also written as the CIE 1931 color coordinate with lowercase letters. An illuminant color coordinate will be described herein in accordance with the above notation. The light represented with X, Y, and Z can be converted into CIE color coordinates (x, y, z) by using X, Y, and Z values.

The combination unit 630 mixes color coordinates of the reflected light output by the first color coordinate calculation unit 610, and the dark room output light output by the second color coordinate calculation unit 620.

Figure 7:
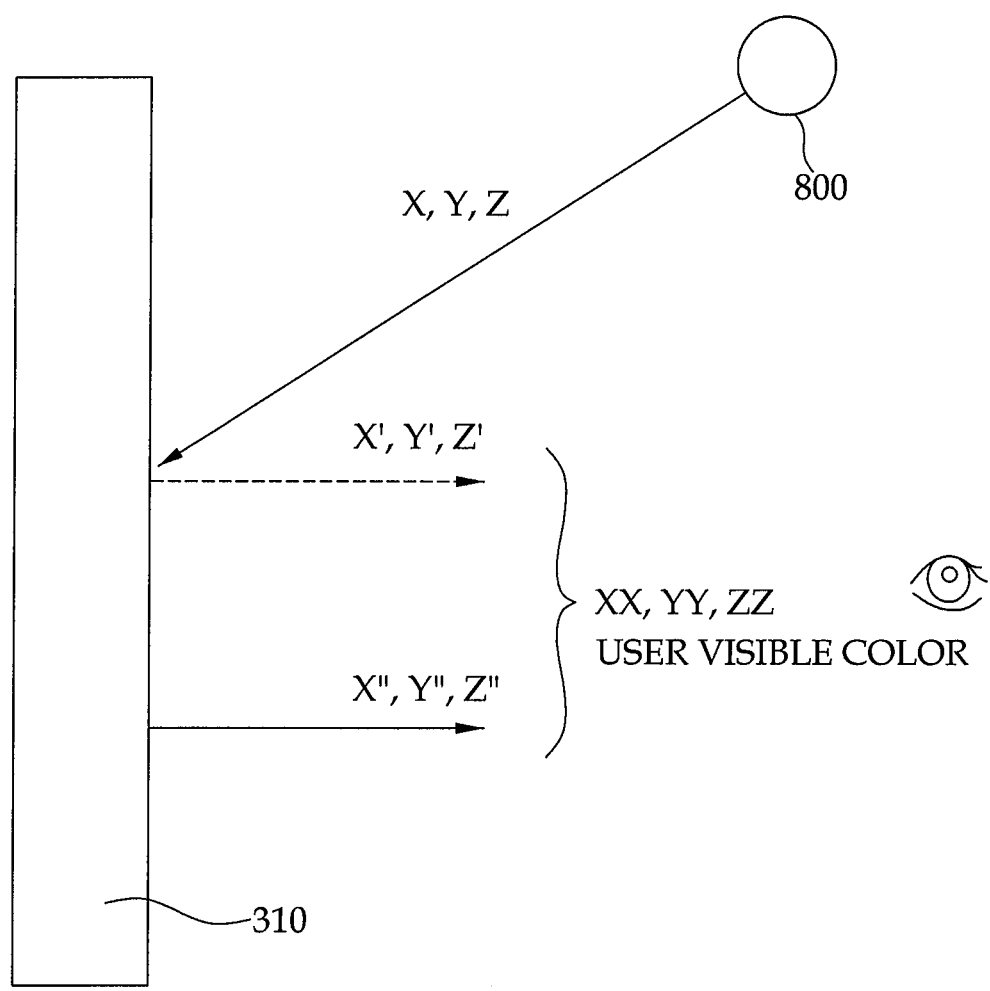
FIG. 7 is a conceptual diagram showing a mixed color of reflected light and dark room output light of a display device.

FIG. 7 is a conceptual diagram showing a mixed color of reflected light and dark room output light of a display device. In other words, FIG. 7 is a mimetic diagram showing distortion of colors visible to a user's eyes, because reflected light (X', Y', Z') generated by ambient light (X, Y, Z) emitted from an external light source 800 is mixed (XX, YY, ZZ) with dark room output light (X", Y", Z"). Variables for simulation of colors perceived by a user under bright room conditions are color coordinates (X, Y, Z) of the ambient light, color coordinates (X', Y', Z') of the reflected light, color coordinates (X", Y", Z") of the dark room output light, and the like.

The first color coordinate calculation unit 610 calculates the color coordinates of the reflected light, and the second color coordinate calculation unit 620 calculates the color coordinates of the dark room output light for each grayscale value section on the basis of, for example, the colors of the MacBeth Color Chart shown in FIG. 6.

The color coordinates (X', Y', Z') of the reflected light of a display device can be calculated by the following Formula 3 using the color coordinates (X, Y, Z) of the ambient light emitted from the external light source 800 and surface reflectance of the display device.

$X'=0.00226\times\text{relative } X \text{ of a light source}\times\text{reflectance (SCI)}\times\text{illuminance};$ $Y'=0.00226\times\text{relative } Y (=1) \text{ of a light source}\times\text{reflectance (SCI)}\times\text{illuminance};$ and $Z'=0.00226\times\text{relative } Z \text{ of a light source}\times\text{reflectance (SCI)}\times\text{illuminance}$ Formula 3

The illuminance of the external light source 800 measured by the light sensor 700 is applied to obtain the color coordinates (X', Y', Z') of the reflected light. The relative color coordinates X, Y, and Z of the light source are standardized by setting Y as a reference value 1 in the color coordinates (X, Y, Z) of the external light source measured by the light sensor 700. The constant 0.00226 is a representative constant that is used to calculate the surface reflectance of a display device. The reflectance determined according to surface characteristics of the display device is applied. The reflected light varies depending on luminance of the ambient light and color temperature, and thus the color coordinates of the reflected light is calculated by the first color coordinate calculation unit 610 of the display device and is updated.

FIG. 8 is a chart of 8 bit sRGB grayscale values corresponding to the Macbeth Color Chart. The grayscale values shown in FIG. 8 indicate digital input image signal values that are input to calculate the color coordinates (X", Y", Z") of the dark room output light. In FIG. 8, the RGB 8 bit grayscale values are used as the input signals, and thus the red, green, and blue input values range from the minimum value 0 to the maximum value $255(2^8)$, respectively. According to an embodiment of the present invention, the RGB 8 bit is taken as an example of an input method for ease of description. However, embodiments of the present invention are not limited thereto, and a variety of input methods such as RGB 10 bit can be applied according to the input methods of the display device. When the input method changes, the standard color is displayed to correspond to the reference color coordinate.

The second color coordinate calculation unit 620 calculates the color coordinates (X", Y", Z") of the dark room output light for each grayscale value section by using, for example, Formulas 4 and 5 below. According to an embodiment of the present invention, the second color coordinate calculation unit 620 divides the whole grayscale value section into the first and second sections, and sets the boundary grayscale value as 127. However, embodiments of the present invention are not limited thereto. For example, the whole grayscale value section can be divided into three sections or more as described below.

The output grayscale values may be realized to have the same value by the first section mathematical formula and the second section mathematical formula in the 127 grayscale value that is the boundary grayscale value. When the values of the boundary grayscale values are calculated to be almost the same by each mathematical formula of the first and second sections, deviation of the output grayscale value, for example, luminance and color coordinate, may not be found in the boundary grayscale value, and optimal or improved image quality can be achieved.

The color coordinates (X", Y", Z") of the dark room output light can be generated in the form of a dark room output light color coordinate table by varying γ1 and γ2 with each 0.1 unit change between the minimum value 0 and the maximum value 10, and by combining the varying γ1 and γ2 with respect to the grayscale values (R, G, and B) of the twenty-four (24) colors of the Macbeth Color Chart. The generated color coordinate table is represented by RGB color coordinates, and can be converted into XYZ color coordinates, which are tristimulus values, by using a transformation matrix like, for example, the reflected light.

The second color coordinate calculation unit 620 calculates output grayscale values R, G, and B corresponding to input grayscale values r, g, and b by varying the two variables γ1 and γ2 with each 0.1 unit change in the range of 0 to 10 according to the following Formula 4. The calculation results of combining gamma values for each color of the Macbeth Color Chart can be stored in a table form, or can be used by the second color coordinate calculation unit 620 by calculating input values in real time.

First section grayscale values (0~127) formula $R=(r^{\gamma 1})/(255^{\gamma 1})$ $G=(g^{\gamma 1})/(255^{\gamma 1})$ $B=(b^{\gamma 1})/(255^{\gamma 1})$ Second section grayscale values (127~255) formula $R=(a'\times(r^{\gamma 2}/255^{\gamma 2})+b')$ $G=(a'\times(G^{\gamma 2}/255^{\gamma 2})+b')$ $B=(a'\times(b^{\gamma 2}/255^{\gamma 2})+b')$ $a'=(\gamma 1\times \text{boundary grayscale}^{(\gamma 1-1)})\div(\gamma 2\times \text{boundary grayscale}^{(\gamma 2-1)})$ $b'=(\text{boundary grayscale}^{(\gamma 1)})\div(a'\times \text{boundary grayscale}^{(\gamma 2)})$ Formula 4

In the Formula 4, the grayscale value may be referred to as a grayscale.

FIG. 9 is a chart showing a part of gamma-corrected color coordinates in the Macbeth Color Chart according to an embodiment of the present invention. FIG. 9 shows a part of the color coordinates of the dark room output light in which the two variables γ1 and γ2 are combined in the range of 0 to 10 with respect to dark skin in the Macbeth Color Chart. For example, referring to FIGS. 8 and 9, the output values (R, G, B) are calculated as shown in the table of FIG. 9 by Formula 4 in the case where the input values (r, g, b) of the dark skin are 115, 82, and 68, respectively. In FIG. 9, one color of dark skin is shown as an example, but further tables for all 24 colors of the Macbeth Color Chart can be generated.

The second color coordinate calculation unit 620 converts the color coordinates (R, G, B) of the dark room output light, which are calculated in FIG. 9, into the XYZ color coordinates. A 3×3 transformation matrix such as Formula 5 is generally used to convert the color coordinates.

The transformation matrix of Formula 5 is a matrix that converts sRGB color coordinates into XYZ color coordinates. A value of the transformation matrix is interlocked with coordinate values of the primary colors, and a constant of the matrix can vary depending on the kinds of the RGB color space.

$$\begin{bmatrix} X'' \\ Y'' \\ Z'' \end{bmatrix} = \begin{bmatrix} 0.57667 & 0.18556 & 0.18823 \\ 0.29734 & 0.62736 & 0.07529 \\ 0.02703 & 0.07069 & 0.99134 \end{bmatrix} \begin{bmatrix} R \\ G \\ B \end{bmatrix}. \quad \text{Formula 5}$$

The second color coordinate calculation unit 620 converts the color coordinates of the dark room output light in real time. Further, in the case where a fixed value is used as a boundary grayscale value, the second color coordinate calculation unit 620 stores calculation results of Formulas 4 and 5 therein, or in another element of the controller 600 on the basis of the boundary grayscale value so as to use the calculation results.

In the above description, the first color coordinate calculation unit 610 calculates the reflected light generated by the ambient light, and the second color coordinate calculation unit 620 calculates the dark room output light of a display device by combining the two variables γ1 and γ2 together.

The combination unit 630 combines the color coordinates (X', Y', Z') of the reflected light, which are output values of the first color coordinate calculation unit 610, and the color coordinates (X", Y", Z") of the dark room output light of the display device, which are output values of the second color coordinate calculation unit 620, by using the below Formula 6 so as to calculate the color coordinates (XX, YY, ZZ) of the combination light visible to a user. When the reflected light and the dark room output light are all converted in advance to be displayed in the form of the XYZ color coordinates, the combination unit 630 can calculate the color coordinates of the combination light by performing simple addition as in the following Formula 6:

$XX, YY, ZZ = X'+X'', Y'+Y'', Z'+Z''$ \quad Formula 6

The combination unit 630 converts the combination light XX, YY, and ZZ from the CIE XYZ to the CIE 1931 such as the reference color coordinate according to the below Formula 7. Coordinate values of the CIE 1931 color coordinate satisfy x+y+z=1. Therefore, the combination unit 630 calculates x' and y', and obtains a z' value by using the x' and y' where necessary (e.g., z'=1−x'−y').

$$x' = \frac{XX}{(XX+YY+ZZ)}$$ Formula 7

$$y' = \frac{YY}{(XX+YY+ZZ)}.$$

The gamma value setting unit 650 receives the color coordinates of the combination light, which are converted by using Formula 7, from the combination unit 620 so as to calculate a deviation between the reference color coordinate and the combination light, and to set a gamma value. Since the reference color coordinates includes 24 colors, the color coordinates of the combination light are calculated with respect to the 24 colors that are the same or substantially the same as those of the reference color coordinates. For calculation efficiency, the color coordinates of the combination light can also be obtained by selecting a smaller number of colors than the 24 colors of the reference color coordinates.

The gamma value setting unit 650 obtains Δxy with respect to the combination of γ1 and γ2 using the following Formula 8:

$$\Delta xy = ((x'-x)^2 + (y'-y)^2)^{1/2}$$ Formula 8

Herein, x and y are coordinate values of the reference color coordinates, x' and y' are coordinate values of the combination light color coordinates, and Δxy is a deviation between the two color coordinates.

When a gamma correction is performed by using a gamma curve in a display device, the gamma value setting unit 650 calculates Δxy for all of the 24 colors of the Macbeth Color Chart using Formula 8, in order to realize optimal image quality for all the colors. Average values of Δxy are obtained for all colors corresponding to the combination of γ1 and γ2, and the smallest combination of γ1 and γ2 is selected from the average values of Δxy.

The change of γ1 made in the low grayscale value region is smaller than that of γ2 of the high grayscale value region according to the change of the ambient light, and thus γ2 is variable while γ1 is set to be fixed.

In order to set a gamma value, the gamma value can be set by considering factors in addition to the average values of Δxy. An algorithm, which selects the optimum γ1 and γ2 using Δxy, may be used to consider characteristics of a display device, calculation speed of the controller, and the like.

The gamma curve generating unit 660 receives set values of γ1 and γ2 so as to generate a gamma curve to suit the input grayscale value section.

The gamma correction unit 670 applies gamma correction to the input image data DATA by the gamma curve generated by the gamma curve generating unit 660 so as to output the output image data DAT to the data driver 500.

Figure 10:
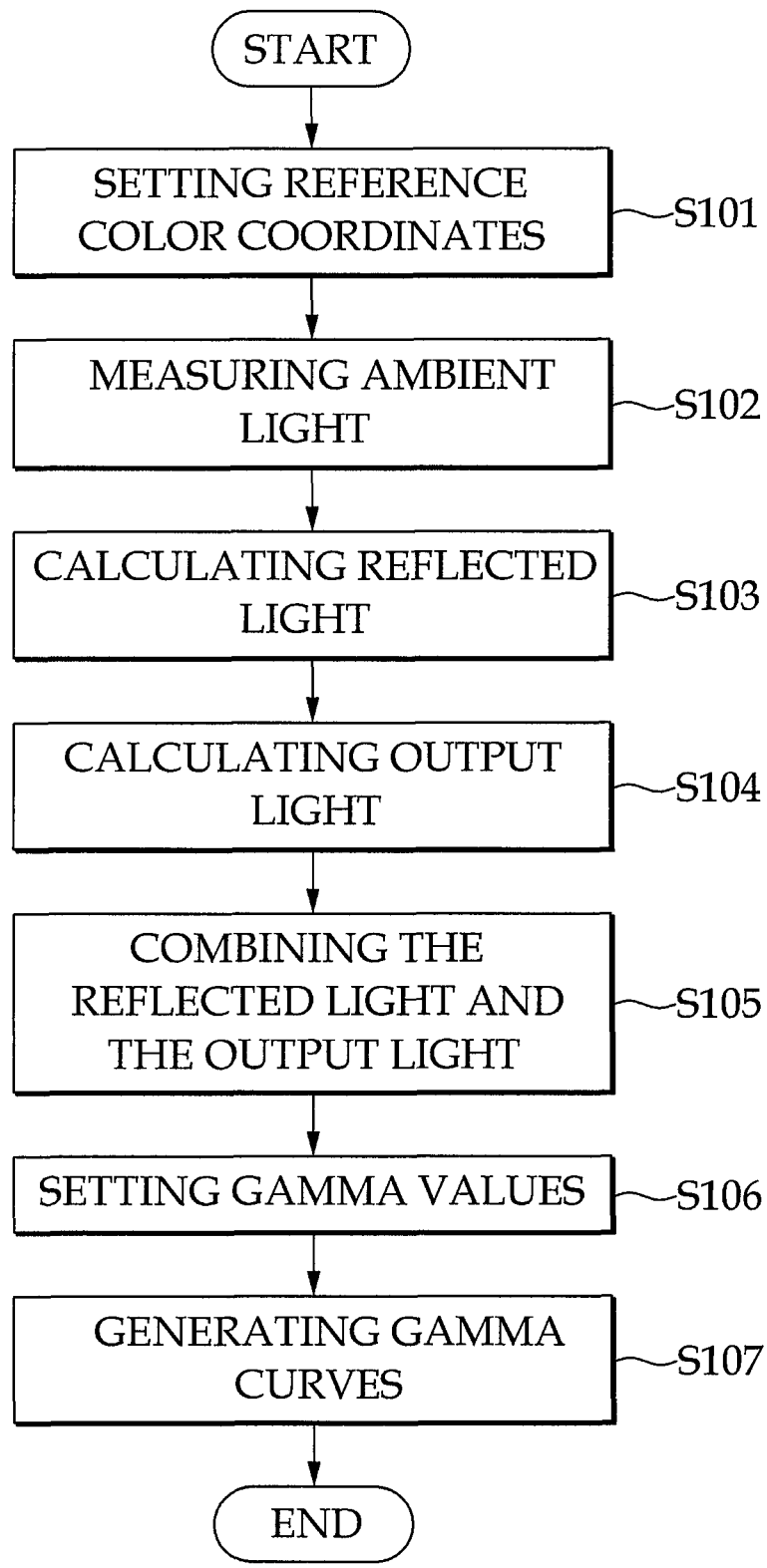
FIG. 10 is a flowchart showing an operation sequence of a method for setting a gamma value according to an embodiment of the present invention.

FIG. 10 is a flowchart showing an operation sequence of a method for setting a gamma value according to an embodiment of the present invention.

Reference color coordinates are first set under the standard illuminant by using the Macbeth Color Chart. The reference color coordinates are set for all 24 colors of the Macbeth Color Chart (S101).

Ambient light of a display device is measured (S102), and color coordinates of reflected light generated by the ambient light are calculated (S103).

Dark room output light of the display device is calculated with respect to the 24 colors of the reference color coordinates, and the dark room output light is converted into the same color space as the reflected light (S104).

Calculation results of the reflected light and the dark room output light are combined with each other (S105).

A gamma value is set to have the smallest difference between the combined color coordinates of the reflected light and the dark room output light and the Macbeth Color Chart (S106).

A gamma curve is generated by the set gamma value (S107). Input image data can be gamma-corrected by the gamma curve in the display device.

Figure 11:
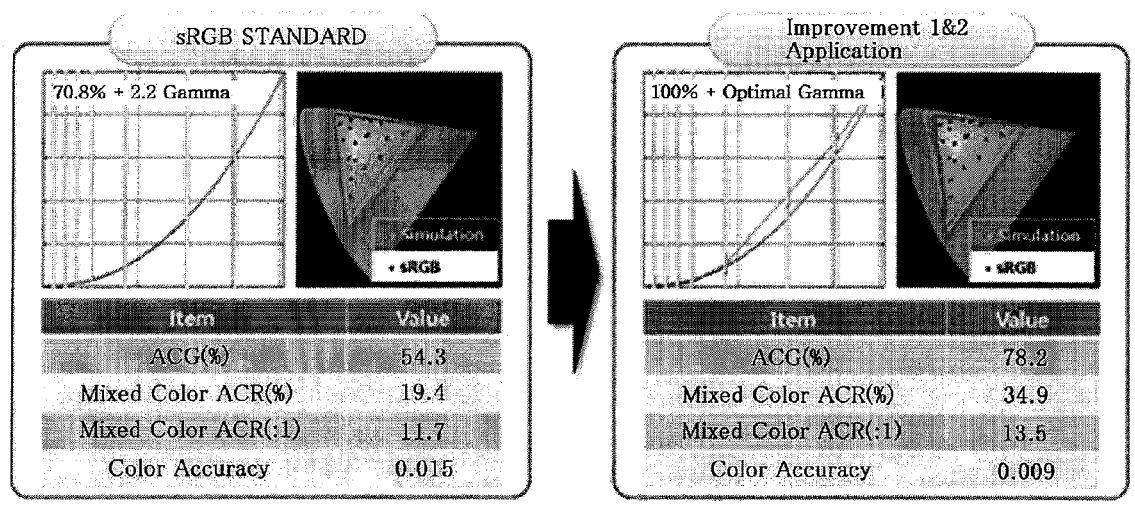
FIG. 11 is a diagram showing a deviation of color coordinates applied with a gamma curve according to prior art and a deviation of color coordinates applied with a gamma curve according to an embodiment of the present invention.

FIG. 11 is a diagram showing a deviation of color coordinates applied with a gamma curve according to a prior art and a gamma curve according to an embodiment of the present invention.

Referring to FIG. 11, a display device according to an embodiment of the present invention exhibits an improved deviation of color coordinates between bright room output light and the Macbeth Color Chart when compared to a conventional technology.

The controller 600 according to embodiments of the present invention further includes a lookup table configured to store a plurality of gamma curves previously calculated on the basis of the reflected light and the dark room output light, and the gamma curve generating unit 660 can convert the input image data DATA into the output image data DAT by referring to the lookup table of the gamma curves according to characteristics of the reflected light.

The gamma curve generating unit 660 sets three or more gamma-applied input grayscale value sections and uses different gamma values in each section so as to generate a gamma curve.

The input image data DATA can be gamma-corrected per color by the respective gamma curves for the colors in which two or more gamma values are set for each color.

The controller 600 can be realized in driver integrated circuits (ICs) that can be selected by those having ordinary skill in the art in consideration of processing speed of a display device and storage device capacity. The mathematical formulas described herein are only examples to explain basic concepts, but embodiments of the present invention are not limited thereto, and the calculations can be conducted through a variety of mathematical formulas and algorithms.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims, and equivalents thereof.

What is claimed is:

1. A display device in which an image data signal is converted by using a gamma curve correction, the display device comprising:
   a light sensor configured to measure ambient light to be converted to an electrical signal;
   a controller that is a processor programmed to correct an input image signal based on the electrical signal output by the light sensor and the input image signal, the controller comprising:
      a first color coordinate calculator configured to calculate a color coordinate of reflected light;
      a second color coordinate calculator configured to calculate a color coordinate of dark room output light for at least two grayscale value sections;
      a combiner configured to combine the reflected light color coordinate output by the first color coordinate calculator and the dark room output light color coordinate output by the second color coordinate calculator together; and a gamma value setter configured to set a gamma value based on a deviation between the combination light color coordinate output by the combiner and a reference color coordinate;

a data driver configured to apply output image data corrected by the controller to a plurality of pixels; and a scan driver configured to apply scan signals to the plurality of pixels so that the output image data is applied to the plurality of pixels, wherein the gamma value setter is configured to obtain an average value of the deviations for colors and to set a gamma value corresponding to the minimum value of the average values of the deviations.

2. The display device of claim 1, wherein the controller further comprises a gamma curve generator configured to generate a gamma curve corresponding to a grayscale value on the basis of a gamma value output by the gamma value setter.

3. The display device of claim 1, wherein the controller further comprises a gamma corrector configured to correct gray levels of input image data utilizing a gamma curve generated by a gamma curve generator to output output image data.

4. The display device of claim 3, wherein the gamma corrector is further configured to apply gamma correction to the input image data using different gamma curves according to colors.

5. The display device of claim 1, wherein the gamma value setter is configured to calculate the deviation using the following Formula 8:

$$\Delta xy = ((x'-y)^2 + (y-y)^2)^{1/2},$$

where x and y represent coordinate values of the reference color coordinates, x' and y' represent coordinate values of the combination light color coordinates, and $\Delta xy$ represents the deviation between the reference color coordinates and the combination light color coordinates.

6. The display device of claim 1, wherein the first color coordinate calculator is configured to calculate the reflected light color coordinate (X', Y', Z') by the following Formula 3:

$$X' = 0.00226 * \text{relative } X \text{ of a light source} * \text{reflectance (SCI)} * \text{illuminance};$$

$$Y' = 0.00226 * \text{relative } Y (=1) \text{ of a light source} * \text{reflectance (SCI)} * \text{illuminance; and}$$

$$Z' = 0.00226 * \text{relative } Z \text{ of a light source} * \text{reflectance (SCI)} * \text{illuminance},$$

where X', Y', and Z' represent color coordinates of the reflected light, and X, Y, and Z represent color coordinates of the ambient light or light source.

7. The display device of claim 1, wherein the second color coordinate calculator is configured to calculate the dark room output light color coordinate by the following Formulas 4 and 5:

a first section $$R = (r^{\gamma 1})/(255^{\gamma 1})$$

$$G = (g^{\gamma 1})/(255^{\gamma 1})$$

$$B = (b^{\gamma 1})/(255^{\gamma 1}),$$

a second section $$R = (a' \times (r^{\gamma 2}/255^{\gamma 2}) + b')$$

$$G = (a' \times (g^{\gamma 2}/255^{\gamma 2}) + b')$$

$$B = (a' \times (b^{\gamma 2}/255^{\gamma 2}) + b')$$

$$a' = (\gamma 1 \times \text{boundary grayscale}^{(\gamma 1-1)}) \div (\gamma 2 \times \text{boundary grayscale}^{(\gamma 2-1)})$$

$$b' = (\text{boundary grayscale}^{(\gamma 1)}) \div (a' \times \text{boundary grayscale}^{(\gamma 2)}); \text{ and} \quad \text{Formula 4}$$

$$\begin{bmatrix} X'' \\ Y'' \\ Z'' \end{bmatrix} = \begin{bmatrix} 0.57667 & 0.18556 & 0.18823 \\ 0.29734 & 0.62736 & 0.07529 \\ 0.02703 & 0.07069 & 0.99134 \end{bmatrix} \begin{bmatrix} R \\ G \\ B \end{bmatrix}, \quad \text{Formula 5}$$

where R, G, and B represent output grayscale values, r, g, and b represent input grayscale values, γ1 represents a first gamma value, γ2 represents a second gamma value, a' and b' represent variables to not change a slope of a gamma curve dramatically in the boundary grayscale, and X", Y", and Z" represent the color coordinates of the dark room output light.

8. The display device of claim 1, wherein the controller further comprises a reference color coordinator configured to provide the gamma value setter with a reference color coordinate.

9. The display device of claim 8, wherein the reference color coordinator comprises a color coordinate of colors of a Macbeth color chart.

10. The display device of claim 1, wherein the controller further comprises a lookup table configured to store a plurality of gamma curves previously calculated based on the reflected light and the dark room output light.

11. A display device in which an image data signal is converted by using a gamma curve correction, the display device comprising:

a light sensor configured to measure ambient light to be converted to an electrical signal;

a controller that is a processor programmed to correct an input image signal based on the electrical signal output by the light sensor and the input image signal, the controller comprising:

a first color coordinate calculator configured to calculate a color coordinate of reflected light;

a second color coordinate calculator configured to calculate a color coordinate of dark room output light for at least two grayscale value sections;

a combiner configured to combine the reflected light color coordinate output by the first color coordinate calculator and the dark room output light color coordinate output by the second color coordinate calculator together; and a gamma value setter configured to set a gamma value based on a deviation between the combination light color coordinate output by the combiner and a reference color coordinate;

a data driver configured to apply output image data corrected by the controller to a plurality of pixels; and a scan driver configured to apply scan signals to the plurality of pixels so that the output image data is applied to the plurality of pixels, wherein the controller further comprises a gamma curve generator configured to generate a gamma curve corresponding to a grayscale value on the basis of a gamma value output by the gamma value setter, and wherein the gamma curve generator is configured to generate a gamma curve by the following Formula 2:

a first section output grayscale value (luminance):
$Y_1 = g^{\gamma 1}$, and a second section output grayscale value (luminance):
$Y_2 = a' \times (g^{\gamma 2}) + b'$, where $Y_1$ represents the first section output grayscale value, $g^{\gamma 1}$ represents an exponential function curve of a first gamma value γ1, Y2 represents the second section output grayscale value, $g^{\gamma 2}$ represents an exponential function curve of a second gamma value γ2, and a' and b' represent variables to not change a slope of the gamma curve dramatically in a boundary grayscale value region.

12. A method for driving a display device, the method comprising:

measuring ambient light by a light sensor to be converted into an electrical signal;

calculating a color coordinate of reflected light by a first color coordinate calculator program in a processor;

calculating a color coordinate of dark output light by a second color coordinate calculator program in the processor;

combining the reflected light color coordinate and the dark output light color coordinate together, respectively output by the first color coordinate calculator and the second color coordinate calculator, by a combiner program in the processor;

setting a gamma value by a gamma value setter program in the processor based on a deviation between the combined light color coordinate output by the combiner and a reference color coordinate, and obtaining an average value of the deviations for colors and setting a gamma value corresponding to the minimum value of the average values of the deviations by the gamma value setter program.

13. The method of claim 12, further comprising generating a gamma curve using a preset gamma value.

* * * * *